(12) United States Patent
Ballabriga et al.

(10) Patent No.: US 7,667,205 B2
(45) Date of Patent: Feb. 23, 2010

(54) METHOD FOR DETERMINING A PARTICLE AND SENSOR DEVICE THEREFOR

(75) Inventors: Rafael Ballabriga, Geneva (CH); Michael Campbell, Geneva (CH); Christer Frojdh, Sundsvall (SE); Henricus M. Heijne, Meyrin (CH); Xavier Llopart, Sergy (FR); Hans-Erik Nilsson, Sundsvall (SE); Lukas Tlustos, Geneva (CH)

(73) Assignee: Organisation Europeenne pour la Recherche Nucleaire, Geneva (CH)

( * ) Notice: Subject to any disclaimer, the term of this patent is extended or adjusted under 35 U.S.C. 154(b) by 0 days.

(21) Appl. No.: 12/089,341

(22) PCT Filed: Oct. 5, 2005

(86) PCT No.: PCT/EP2005/011645

§ 371 (c)(1),
(2), (4) Date: Apr. 4, 2008

(87) PCT Pub. No.: WO2007/038974

PCT Pub. Date: Apr. 12, 2007

(65) Prior Publication Data

US 2008/0251730 A1   Oct. 16, 2008

(51) Int. Cl.
*H01L 27/142* (2006.01)
*G01T 1/29* (2006.01)
(52) U.S. Cl. .............................. 250/370.09; 250/370.11; 250/370.1; 250/369
(58) Field of Classification Search ................ 250/369, 250/370.09, 370.11, 370.1
See application file for complete search history.

(56) References Cited

U.S. PATENT DOCUMENTS 6,246,436 B1    6/2001  Lin et al.

(Continued)

FOREIGN PATENT DOCUMENTS

EP    0480235 A2    4/1992

(Continued)

OTHER PUBLICATIONS

Llopart, X. et al., "Medipix2, a 64K Pixel Read out Chip with 55 Mum Square Elements Working in Single Photon Counting Mode", 2001 IEEE Nuclear Science Symposium Conference Record/2001 IEEE Nuclear Science Symposium and Medical Imaging Conference, San Diego, CA, Nov. 4-10, 2001, IEEE Nuclear Science Symposium Conference Record, New York, NY, IEEE, U.S., vol. 3 of 4, Nov. 4, 2001, pp. 1484-1488, XP001149916, ISBN: 0-7803-7324-3, part "I. Introduction", part "IV. Future Developments".

(Continued)

*Primary Examiner*—David P Porta
*Assistant Examiner*—Yara B Green
(74) *Attorney, Agent, or Firm*—Patzik, Frank & Samotny Ltd.

(57) ABSTRACT

A method for determining a particle impact on a sensor device comprising M sensing areas, each impact causing a variation of at least one physical magnitude of several sensing portions, said method comprising the steps of: determining an impact center sensing area, where the variation of the at least one physical magnitude is substantially maximal, allocating a result of a sum of the physical magnitude variations of a first set of N sensing areas, said set including the impact center area and other sensing areas neighboring said impact center sensing area, where N is at least 2 and is strict less than M.

8 Claims, 4 Drawing Sheets

U.S. PATENT DOCUMENTS

| 6,311,895 | B1 | 11/2001 | Olmstead et al. | |
|---|---|---|---|---|
| 6,329,658 | B1 | 12/2001 | Mestais et al. | |
| 6,380,530 | B1 | 4/2002 | Afghahi | |
| 6,399,950 | B1 | 6/2002 | Kimura et al. | |
| 6,421,132 | B1 * | 7/2002 | Brajovic | 356/602 |
| 6,437,341 | B1 | 8/2002 | Izumi et al. | |
| 6,809,768 | B1 | 10/2004 | Merrill | |
| 2002/0090050 | A1 * | 7/2002 | Nutt et al. | 378/19 |
| 2002/0195566 | A1 | 12/2002 | Rodricks et al. | |
| 2003/0164888 | A1 | 9/2003 | Orava et al. | |
| 2004/0026623 | A1 | 2/2004 | Doty et al. | |
| 2004/0262528 | A1 * | 12/2004 | Zaikin et al. | 250/369 |

FOREIGN PATENT DOCUMENTS

| JP | P2000111651 A | 4/2000 |
|---|---|---|
| WO | WO03/075555 A1 | 9/2003 |

OTHER PUBLICATIONS

Tlustos, L. et al., "Signal Variations in High Granularity Si Pixel Detectors", 2003 IEEE Nuclear Science Symposium Conference Record/2003 IEEE Nuclear Science Symposium and Medical Imaging Conference, Portland, OR, Oct. 19-25, 2003, IEEE Nuclear Science Symposium Conference Record, New York, NY, IEEE, US, vol. 5 of 5, Oct. 19, 2003, pp. 1588-1593, vol. 3, XP010735914, ISBN: 0-7803-8257-9, part "V. Discussion and Conclusion", Fig. 13.

International Search Report for PCT/EP2005/011645.

Tumer, T.A., et al., "Preliminary Results Obtained from a High Resolution Hybrid CdZnTe Pixel Detector Developed for High Energy X-Ray Astronomy", 2001 IEEE, Sect. 4, pp. 90-96 (supported by NASA SR&T Grant No. NAG5-5118).

Lindner, M., et al., "Medical X-Ray Imaging with Energy Windowing", 2001 Elsevier Science B.V., Nuclear Instruments and Methods in Physics Research, A 465 (2001) pp. 229-234, (supported by the Ministerium fur Wissenschaft und Forschung des Landes Nordrhein-Westfalen under contract IV A5 106 001 98).

Edling, F., et al., "Characterisation of a Pixel Readout Chip for Medical X-Ray Imaging", 2004 Elsevier B.V., Nuclear Instruments and Methods in Physics Research A 525 (2004) pp. 217-220.

Amendolia, S. Roberto, et al., "Full Field Images of Mammographic Phantoms Obtained with a Single Photon Counting System", Medical Imaging 2003: Physics of Medical Imaging, M. J. Yaffe, L. E. Antonuk, Editors, Proceedings of SPIE vol. 5030 (2003) pp. 191-202.

Pancella, D., et al., "Fast 2-D Soft X-Ray Imaging Device Based on Micro Pattern Gas Detector", 2003 Elsevier B. V., Nuclear Physics B (Proc. Suppl.) 125 (2003) pp. 332-336.

Bates, R., et al., "Performance of an Energy Resolving X-Ray Pixel Detector", 2002 Elsevier Science B.V., Nuclear Instruments and Methods in Physics Research A 477 (2002) pp. 161-165.

Giardeau-Montaut, J.-P., et al., "Low Dose Imaging of Technical and Biological Objects Using Ultrashort X-Ray Pulses and Photon Counting Chip", Laboratoire de Sciences et Ingenierie des Surfaces, Universite Claude Bernard—Lyon1, 43, bd du Nov. 11, 1918, Villeurbanne, France.

Neeser, W., et al., "DEPFET—A Pixel Device with Integrated Amplification", 2002 Elsevier Science B.V., Nuclear Instruments and Methods in Physics Research A 477 (2002) pp. 129-136 (supported by the Deutsche Forschungsgemeinschaft (DFG) under contract WE 976/2-1 and by the Ministerium fur Wissenschaft und Forschung des Landes Nordrhein-Westfalen under contract IV A5 106 001 98).

* cited by examiner

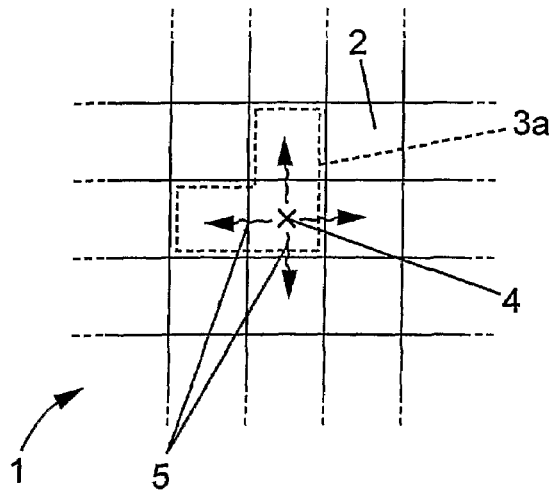
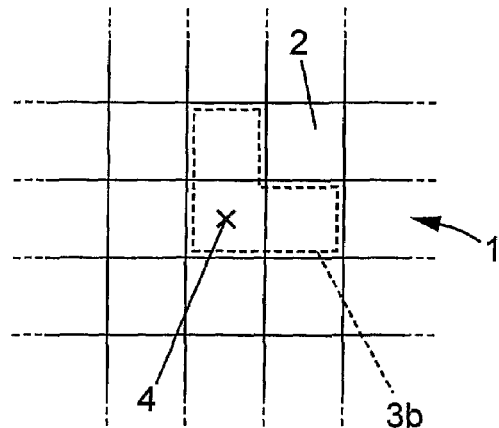
FIG. 1A                FIG. 1B
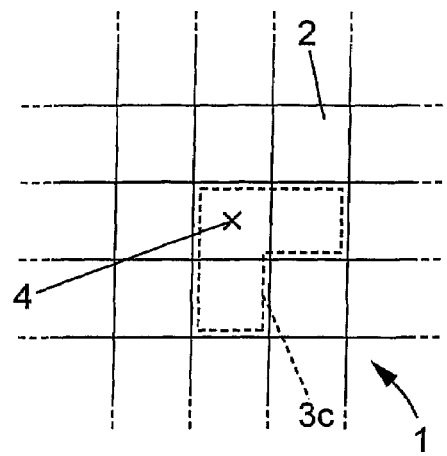
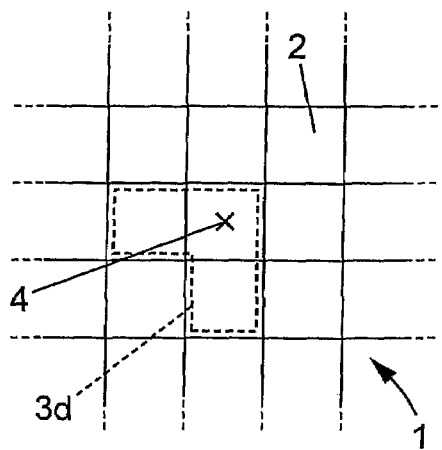
FIG. 1C                FIG. 1D

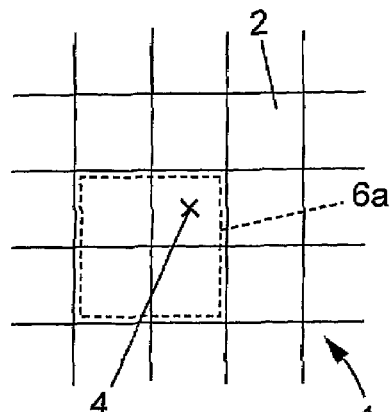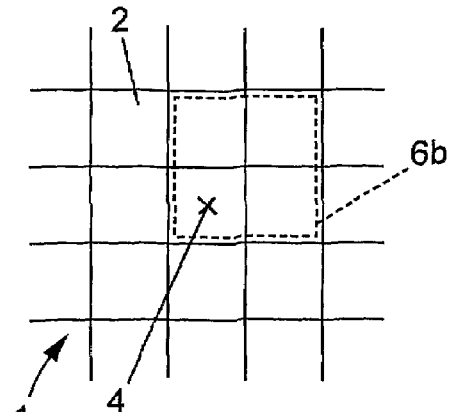
FIG. 2A  FIG. 2B
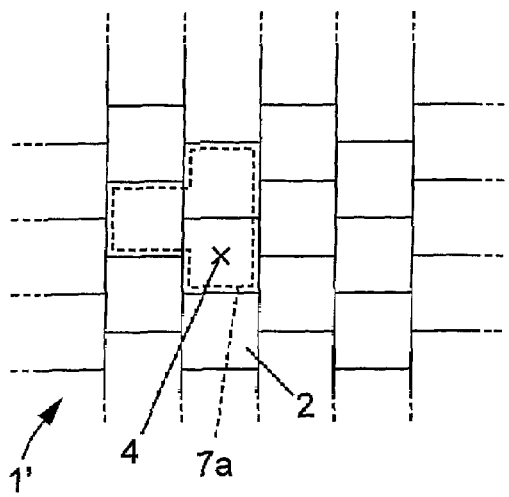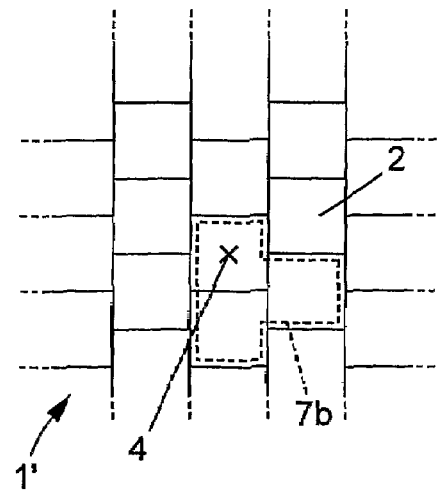
FIG. 3A  FIG. 3B
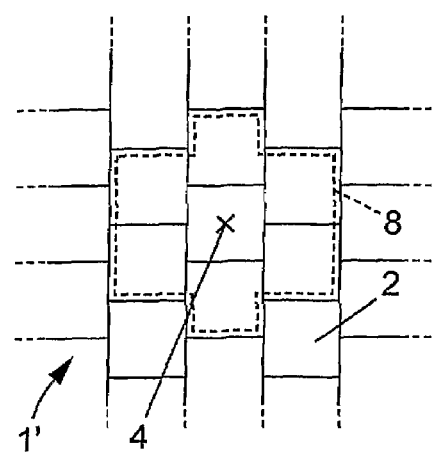
FIG. 3C

METHOD FOR DETERMINING A PARTICLE AND SENSOR DEVICE THEREFOR

FIELD OF THE INVENTION

The present invention relates to methods for determining a particle impact and sensor device for sensing and determining particle impacts.

BACKGROUND OF THE INVENTION

In imaging systems, for example adapted for X-ray, the sensor device comprises an array of sensing areas, for sensing a photon impact. The impact of a photon causes a variation of a physical magnitude, for instance the charge or the voltage of a sensing area. In single photon counting sensing devices, each impinging photon is counted and allocated to the area on which it impacted. However, for sensing device with high resolution, and where the pixel pitch is similar to or smaller than the sensor device thickness, the energy deposited by the impinging photon is shared by a plurality of sensing areas. Consequently, the variation of physical magnitude of the impact center sensing area is not exactly representative of the energy of the impinging photon. For example, the spectrum resulting of this sensing device is erroneous and does not correspond to the actual X-ray emission received by the sensing device.

Moreover, a single X-ray photon impinging in the vicinity of the edge of a sensing area could be detected as two incoming photons with only half energy.

BRIEF SUMMARY OF THE INVENTION

It is thus an object of the present invention to provide a sensing device and a method of determining a particle impact, like X-ray photons which can output an energy spectrum which is representative of the actual X-ray radiation.

Another object of the invention is to provide a method of determining X-ray photons impinging on a sensor device, with a high signal to noise ratio.

The invention proposes a method for determining a particle impact on a sensor device comprising M sensing areas to said impact center, each impact causing a variation of at least one physical magnitude of several sensing portions, said method comprising the steps of:
(a) determining an impact center sensing area, where the variation of the at least one physical magnitude is substantially maximal;
(b) allocating a result of a sum of the physical magnitude variations of a first set of N sensing areas to said impact center, said set including the impact center area and other sensing areas neighboring said impact center sensing area, where N is at least 2 and is strictly less than M.

Thus, in this method, the magnitude variations of a limited set of sensing areas may be taken into account. This method provides then signals which really correspond to the impinging particle, without adding too much noise, since the number of sensing areas is limited. Moreover, the resolution of an image obtained by this method is improved since each impinging particle is allocated to one pixel. Consequently, the image quality is increased.

According to a first embodiment, the method further comprises the step (c) of selecting the first set of sensing areas, among a plurality of possible sets of sensing areas before the step (b) of allocating the result. Thus, the set is selected on the basis of several criteria. This enables to choose the best set among a plurality of possible sets, increasing then the quality of the resulting signal. The possible sets of sensing areas comprise all the possible combinations of N sensing areas including the center sensing area and other sensing areas neighboring the impact center area. Since the impinging particle will affect mainly the impact sensing area and its neighboring areas, these possible sets provides generally better results.

According to variant of the invention, if the particle impact is detected as a high energy particle impact, the method further comprises the step of (d) allocating a result of a sum of the physical magnitude variations of a second set of P sensing areas, said second set including the impact center area and other sensing areas neighboring said impact center sensing area, where P is greater than n. Indeed, if the energy of the particle is high, the impact will affect a larger number of sensing areas. Consequently, a larger set of sensing areas will be selected in such a case, providing a signal more representative of the high energy particle.

By taking N=4, the resulting signal is closer to the total signal deposited in the sensor, but does not increase in a too large amount the noise of the signal. The signal to noise ratio is then maintained acceptable with such a compromise.

The invention also concerns a sensor device for determining a particle impact comprising M sensing areas, each impact causing a variation of at least one physical magnitude of several sensing areas, said sensor device further comprising:
means for determining an impact center sensing area, where the variation of the at least one physical magnitude is substantially maximal;
means for summing the physical magnitude variations of a first set of N sensing areas including the impact center area and other sensing areas neighboring said impact center sensing area, where N is at least 2 and strictly less than M and providing a result;
means for allocating to said impact center area the result corresponding to said first set.

BRIEF DESCRIPTION OF THE DRAWINGS

FIGS. 1A-1D illustrate a sensor device according to the invention;

FIGS. 2A and 2B illustrate a sensor device according to a variant of the invention;

FIGS. 3A-3C illustrate a sensor device according to a further variant of the invention;

DESCRIPTION OF PREFERRED EMBODIMENTS

Figure 4:
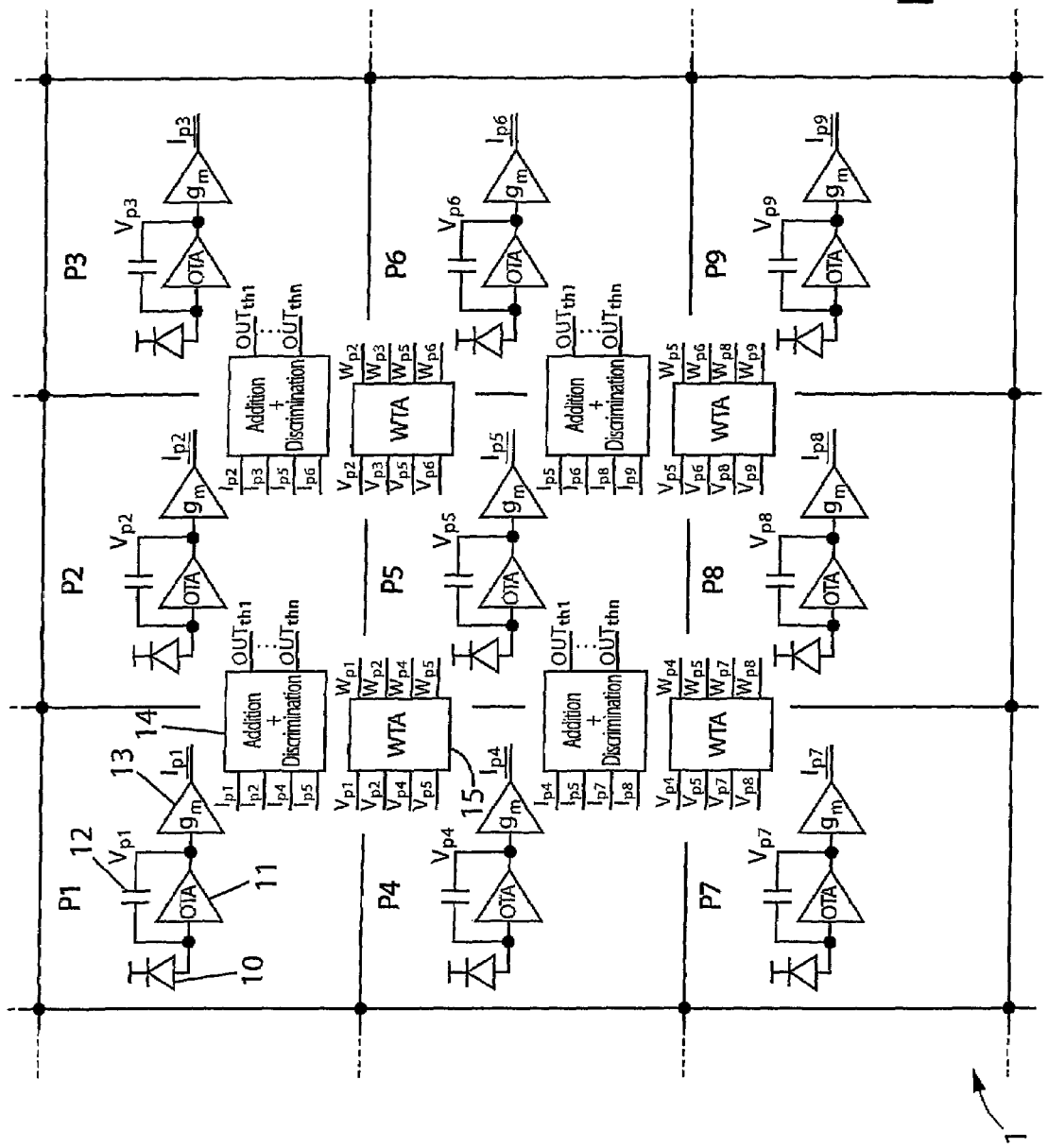
FIG. 4 represents schematically the electronic circuit of the device of FIGS. 2A and 2B.

On FIGS. 1A to 1D, a detection matrix 1 of a sensor device in conformity with the invention is illustrated. This detection matrix 1 comprises M sensing areas, or pixels 2. Such a matrix is arranged to detect and to sense a particle impact on each of the M pixels. For instance, a particle impact is schematically represented by the "X", with the reference 4, on an impact center pixel.

When a particle, like a photon for example, impacts on the detection matrix 1, a physical magnitude of pixels is affected by the energy absorption due to the particle impact and any diffusion of the signal in the sensor. However, as illustrated by the arrows 5 on FIG. 1A, the impact energy may be transmitted to a plurality of pixels. This physical magnitude may be the voltage, the charge, the temperature or likewise.

Consequently, according to the invention, and as illustrated on each FIG. 1A to 1D, the sensor device senses the magnitude variation of a set of sensing areas or set of pixels, 3a to 3d. These sets of 3 pixels may be constituted of the impact center pixel and two neighboring pixels. The FIGS. 1A to 1D introduce all the possible sets of 3 pixels according to this embodiment. According to the invention, the best set of pixels is selected, and the sum of the physical magnitude variation of the set pixels is affected to the impact center pixel. The best set is the set whose physical magnitude variation sum result is maximal.

As illustrated by FIGS. 2A and 2B, the number of pixels in a set may vary, dependant on the desired accuracy, and on the signal to noise ratio limit. On these figures, the shown sets of pixels 6a and 6b comprise 4 pixels, including the impact center pixel. It is also possible to have sets of 5 or more pixels, including the impact center pixel, depending on the requirements of accuracy and signal to noise ratio.

According another embodiment shown on FIGS. 3A and 3B, the sensing device comprises a detection matrix 1', where each column is shifted of a half pixel relating to the preceding column. In such a case, an adapted choice of the number of pixels by set may be 3, as shown with the sets 7a and 7b respectively on FIGS. 3A and 3B. These sets permit to obtain further information of the distance between the impact center and a corner. A variant of this embodiment is shown by FIG. 3C, where the set of pixels 8 is constituted of the 6 pixels surrounding the impact center pixel. In this example, the accuracy of the signal is improved, but the signal to noise ratio is reduced.

The FIG. 4 is a schematic view of the electronic circuit of the detection matrix 1 of FIG. 2A or 2B. This detection matrix 1 comprises pixels P1 to P9. For each pixel P1 to P9, an electronic detection circuit may be formed. This detection circuit comprises for instance a photodiode, 10 which turns the radiation received from the particle impact into an electric current. This current may load a capacitance 12, which is connected in parallel to an Operational Transconductance Amplifier (OTA) 11. The OTA 11 allows the current resulting from the particle impact on the photodiode to be integrated on capacitance 12 producing a voltage Vp1 which is proportional to the total charge deposited by the incoming particle in the single photodiode. This voltage is then transformed into a current Ip1 by the transconductance stage gm.

This detection circuit provides then a signal which is representative of the energy transmitted by the impact in the considered pixel P1. Such a detection circuit is provided for each pixel P1 to P9.

For each possible set of 4 pixels, two circuits 14 and 15 are built, and the corresponding detection circuits of the respective pixels of the sets provide their signals Vp1, Vp2, Vp4, Vp5, and Ip1, Ip2, Ip4, Ip5 to these circuits 14 and 15.

The circuit 14 permits to determine whether an impact occurred in this set, and whether this set is the most representative set of the detection matrix 1. Indeed, this circuit may compare the signals Ip1, Ip2, Ip4 and Ip5 to several thresholds, to determine if an impact occurred, or if a detected impact has to be ignored. A first threshold may be used to eliminate not relevant signals. Moreover, a discrimination may be carried out to maintain only the set in which the best result occurred. Thus, the result of the considered set is compared with the best result of the other sets. If the result of the considered set is greater than the other, this set is selected to provide its signal to a central processing unit for example.

The circuit 15 is a "Winner Takes All" (WTA) circuit, i.e. this circuit adds all the four input signals, and outputs the result to the output among the four outputs Wp1 to Wp4, corresponding to the greatest input.

Consequently, this circuit WTA 15 allocates the result of the sum to the impact center pixel, where the energy due to the impact is maximal. Thus, the output signal, allocated to the impact center pixel, takes into account the energy shared by the four pixels P1, P2, P4, and P5, and does not add too much noise in the output signal. Indeed, the table below shows that the noise increase is substantially proportional to the square of pixel number.

| Configuration | Increase in Noise |
|---|---|
| 1 pixel | 1.0 |
| 3 pixels sums | 1.73 |
| 4 pixels sums | 2.0 |
| 5 pixels sums | 2.24 |
| 7 pixels sums | 2.65 |

In this table, it is shown that the method of summing 4 pixels by set enables to cover a large surface, since the possible sets cover totally 9 pixels. Moreover, the noise increase is 2, which permits a good compromise.

According to a variant of the invention, the discrimination circuit 14 comprises a second threshold which permits to determine whether an impact is a high energy impact. Such a high energy impact, due to high energy photon, is spread in a greater number of pixels. Consequently, if a signal exceeds this second threshold, for example the sum result and/or the impact center pixel signal, the circuit will allocate the sum of a wider set of pixels, for instance a nine pixel set.

Other electronic circuits could permit the summing of several pixels magnitude variations, for example to obtain a more flexible computation of the result. Indeed, the number of pixels by set may be chosen case by case, depending of the impact center result or of the operation conditions.

Figure 5:
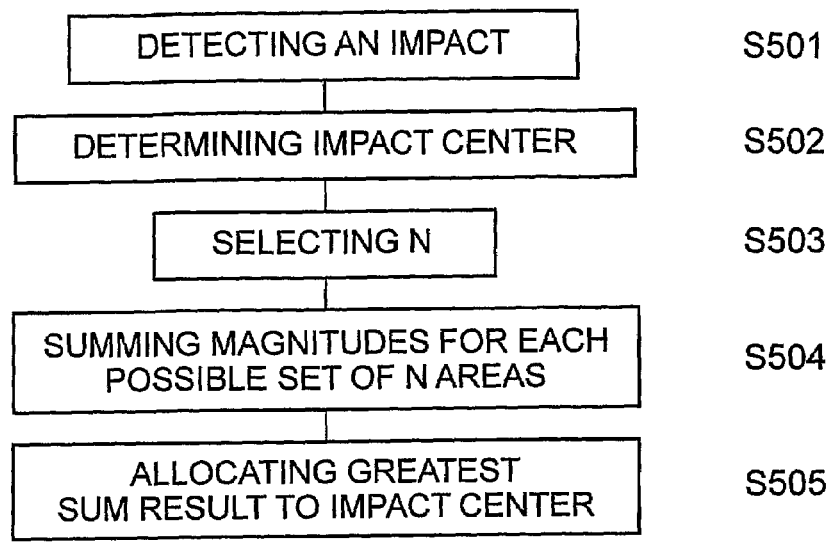
FIG. 5 is a flowchart of a method of detecting particle impact according to the invention.

As shown on FIG. 5, the method comprises a first step (S501) of detecting an impact, for instance when the physical magnitude of a pixel exceeds a predetermined threshold. Then, the impact center, where the magnitude variation is maximal, is determined (S502), by comparing the value of pixels or of sets of pixels. The method may comprise a step selecting the number N of pixels for computing the output signal. This number N may be predetermined dependant on the application, for example only a predetermined range of radiations is expected. Instead, it may depend on the value of the impact center result.

At step S504, the sums of all possible sets of N pixels are computed, and only the best result is allocated to the impact center S505.

Figure 6:
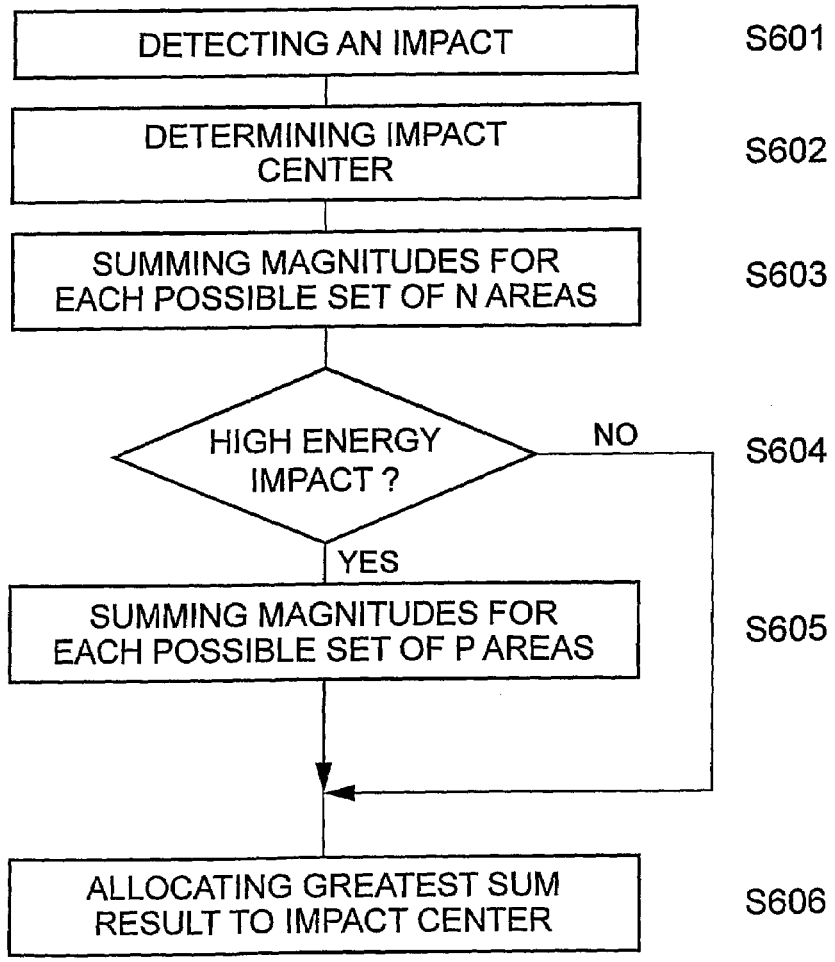
FIG. 6 is a flowchart of a method of detecting an particle impact according to a variant of the invention.

FIG. 6 illustrates a variant of the invention. In this variant, N is predetermined. At steps 601 and 602, an impact is detected and the impact center is determined. Then, at Step 603, the magnitude variations signals of all possible sets of N pixels around the impact center are summed and compared to a threshold at step S604. This threshold permits to determine whether the considered impact is a high energy threshold. In such a case, all the possible sets of P pixels are summed, with P greater than N (S605). Consequently, these sums cover a wider area of the detection matrix, since high energy particle are more shared. Eventually, the greatest sum result is allocated to the impact center pixel (S606).

This method is adapted to different situations, and permits to obtain good results on a larger range of radiation frequencies.

The invention claimed is:

1. A sensor device for determining a particle impact center area, said sensor device comprising M sensing areas, at least one impact causing a variation of at least one physical magnitude of several sensing areas, said sensor device further comprising:
    means for determining an impact center area for each set among a plurality of possible sets of n sensing areas including the impact center area and other sensing areas neighboring said impact center area, where n is at least 2 and strictly less than M;
    a circuit adapted to determine whether an impact occurred in this set;
    a circuit for summing the physical magnitude variations of the set of n sensing areas and providing a result;
    a circuit for selecting a first set of sensing areas, by comparing the results corresponding to the possible sets and determining the first set, as the one for which the result of the sum of the physical magnitudes is maximal;
    said circuit (WTA) further being for allocating to said impact center area the result corresponding to said first set.

2. The sensor device as set forth in claim 1, wherein the possible sets of sensing areas comprise all the possible combinations of n sensing areas including the center sensing area and other sensing areas neighboring the impact center area.

3. The sensor device as set forth in claim 1, wherein the particle is an X-Ray photon.

4. The sensor device as set forth in claim 1, wherein the physical magnitude is one among the following: a charge, a voltage, a temperature or a combination thereof.

5. The sensor device as set forth in claim 1, further comprising:
    detection means for determining whether the particle impact is a high energy particle impact;
    means for summing the physical magnitude variations of a second set of p sensing areas, said second set including the impact center area and other sensing areas neighboring said impact center sensing area, where p is greater than n;
    means for allocating to said impact center area the result corresponding to said second set, if the impact is detected as a high energy particle impact.

6. The sensor device as set forth in claim 5, wherein a particle impact is detected by the detection means as a high energy particle impact in one of the following cases: the result of the sum corresponding to the first set of sensing areas is greater than a first predetermined threshold, the physical magnitude variation of a sensing area not included in the first set is greater than a second predetermined threshold, or a combination thereof.

7. The sensor device as set forth in claim 1, wherein n equals 4.

8. A sensor device for determining a particle impact comprising M sensing areas, each impact causing a variation of at least one physical magnitude of several sensing areas, said sensor device further comprising:
    means for determining an impact center sensing area, where the variation of the at least one physical magnitude is substantially maximal;
    means for selecting a first set of sensing areas, among a plurality of possible sets of n sensing areas including the impact center area and other sensing areas neighboring said impact center sensing area, where n is at least 2 and strictly less than M, comprising means for comparing the results corresponding to the possible sets and determining the first set, wherein the result of the sum of the physical magnitudes corresponding to the first set of sensing areas is maximal;
    means for summing the physical magnitude variations of the first set of n sensing areas and providing a result;
    means for allocating to said impact center area the result corresponding to said first set.

* * * * *